US006905278B2

(12) United States Patent
Kress et al.

(10) Patent No.: US 6,905,278 B2
(45) Date of Patent: Jun. 14, 2005

(54) CONNECTION POINT

(75) Inventors: Dieter Kress, Aalen (DE); Friederich Häberle, Lauchheim (DE)

(73) Assignee: Mapal Fabrik fur Präzisionswerkzeuge, Aalen (DE)

( * ) Notice: Subject to any disclaimer, the term of this patent is extended or adjusted under 35 U.S.C. 154(b) by 11 days.

(21) Appl. No.: 10/092,767

(22) Filed: Mar. 7, 2002

(65) Prior Publication Data

US 2002/0131819 A1 Sep. 19, 2002

(30) Foreign Application Priority Data

Mar. 14, 2001 (DE) ........................................ 101 12 966

(51) Int. Cl.[7] .................................................. F16B 7/00

(52) U.S. Cl. ...................... 403/296; 403/294; 403/305; 403/396; 403/307; 403/343; 279/7; 409/234

(58) Field of Search ............................ 175/320; 279/7; 409/234; 403/292, 294, 296, 299–303, 305–307, 343; 411/402, 403, 405, 410

(56) References Cited

U.S. PATENT DOCUMENTS 1,615,233 A * 1/1927 Redinger .................... 279/42
2,005,498 A * 6/1935 Hart .......................... 403/296
2,022,055 A * 11/1935 Sanderson .................. 175/414
2,935,767 A * 5/1960 Naegeli ...................... 403/13
3,837,759 A * 9/1974 Bittern ...................... 408/204
4,549,615 A * 10/1985 Liang et al. ................ 175/389
4,629,374 A * 12/1986 Berner ...................... 408/186
5,173,017 A * 12/1992 Oshnock et al. ............ 409/234

FOREIGN PATENT DOCUMENTS

DE 39 12 503 A1 3/1990
DE B238 31/02 10/1991
FR 1489160 7/1967
WO WO 00/53362 9/2000

* cited by examiner

*Primary Examiner*—Daniel P. Stodola
*Assistant Examiner*—Michael P. Ferguson
(74) *Attorney, Agent, or Firm*—Morriss O'Bryant Compagni

(57) ABSTRACT

A connection point (1) between two tool parts is proposed which are joined by means of a threaded spindle (7) oriented in longitudinal direction of the tool parts. The threaded spindle has two oppositely threaded sections (13, 15) which interact with two threaded areas (17, 19) in the tool parts. The connection point (1) is distinguished in that at least one end area of the threaded spindle (7) has a shoulder (63), the outside diameter of which is smaller that the interior diameter of the associated threaded area (17).

16 Claims, 1 Drawing Sheet

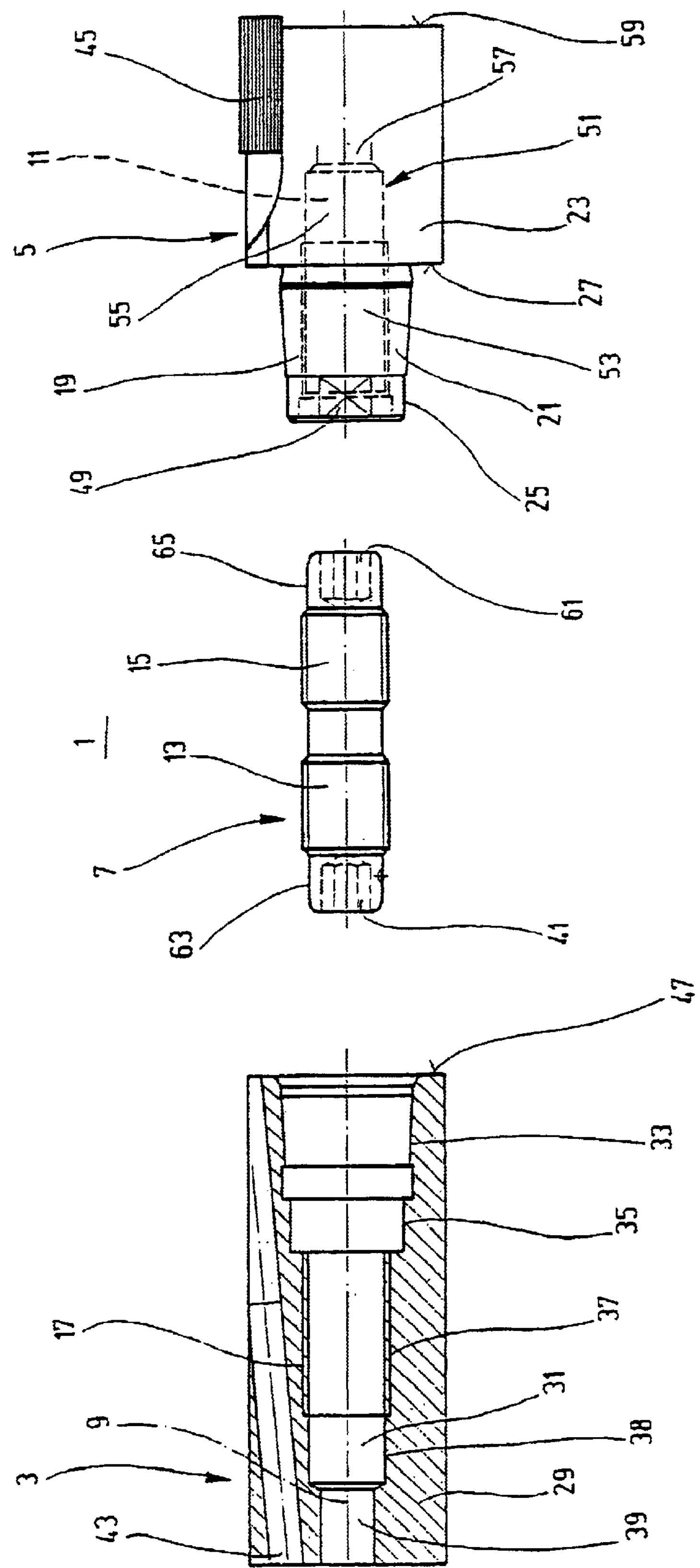
45
59
57
51
11
23
5
27
55
53
19
21
49
25
65
61
15
1
13
7
63
41
47
33
35
17
37
31
9
38
3
29
43
39

CONNECTION POINT

The invention concerns a connection point between two tools according to the precharacterizing clause of claim 1.

Connection points of the type referred to here are known. They serve to connect two tool parts together, for example a tool holder which can be a direct part of a machine tool or can in turn be brought into a machine tool and fastened there, to a tool head; a tool holder to an intermediate part; two intermediate parts to each other, and/or an intermediate part to a tool head. In order to connect the tool parts, a threaded spindle is used which is provided with oppositely threaded sections. These engage in threaded sections of the tool parts to be connected to each other. Upon a rotating movement of the threaded spindle, the two tool parts are firmly connected to each other since the threaded spindle draws the tool parts together so that they securely contact each other.

It has been found that the connection of the two tool parts often is not optimal because prior to assembly of the two tool parts, the threaded spindle is screwed into one of the tool parts to a greater or lesser distance and thus no defined tension can be generated.

SUMMARY OF THE INVENTION

The task of the invention therefore is to create a connection point between two tools in which a defined tension of the two parts can be ensured. For solving this task, a connection point is proposed which has the features mentioned in claim 1. It is distinguished in that the threaded spindle serving to connect the two tool parts has, at least in an end area, a projection which can engage in a threaded section which is provided in the associated tool part. For this purpose, the projection is provided with an outside diameter that is smaller than the interior diameter of the associated threaded area. Upon connecting of two tool parts, the threaded spindle can be inserted in one of the parts, so that the projection engages with the threaded area of the tool part and the threaded spindles are arranged in a defined starting position and if needed may also be held. While the threaded spindle thus is inserted into the first tool part and is retained in a defined position, the second tool part can be placed on the first tool part and the threaded spindle can be caused to rotate. Thus the opposing threaded sections of the threaded spindle engage in the associated threaded areas of the tool parts so that they are pressed firmly against each other and are connected together. Upon connecting the two tool parts, the threaded spindle is arranged as a result of the projection in a defined position. It therefore is not necessary to screw it at least somewhat into the first threaded part and to retain it there securely before the second tool part is placed on the first. Thus a defined starting position of the threaded spindle and a specified tension in the area of the connection point is established.

Especially preferred is an exemplary embodiment of the connection point in which the threaded spindle is provided with a projection on each end which engages in the associated threaded area of the tool parts to be connected to each other. For this purpose it is also provided here that the outside diameter be configured smaller than the interior diameter of the associated threaded area. As a result of the projections provided at both ends of the threaded spindle, the tools can be easily placed one on the other with it being ensured on both sides that the threaded spindle assume a defined initial position.

BRIEF DESCRIPTION OF THE DRAWINGS

The invention will be explained in greater detail below with the aid of the drawing. The one drawing shows a connection point in an exploded depiction.

DETAILED DESCRIPTION

Connection point 1 depicted in the FIGURE has a first tool part which is here configured as tool holder 3, and a second tool part that here is configured as tool head 5. Between the two tool parts, i.e., between tool holder 3 and tool head 5 is situated a threaded spindle 7, which is oriented in the longitudinal direction of the tool parts, here coaxially to middle axis 9 of tool holder 3 and to middle axis 11 of tool head 5. Threaded spindle has two oppositely threaded sections 13 and 15 which are configured as exterior threads and interact with the threaded areas 17 and 19 configured as interior threads in tool holder 3 and tool head 5, respectively. Tool head 5 has a preferably conically configured projection, also designated retaining cone, 21 which tapers from the base body 23 of the tool head toward the left and transitions into a cylindrical section 25. Provided at base body 23 is a bearing surface 27 that encircles projection 21.

Correspondingly, tool holder 3 or its base body 29 is provided with a recess 31 that receives not only parts of threaded spindle 7 but also parts of tool head 5. It has a conical first section 33 tapering from right to left which is dimensioned such that in assembled state of connection point 1, projection 21 fits securely here. In addition, a cylindrical second section 35 is provided that receives cylindrical section 25 of tool head 5. In a third section 37 adjoining second section 35, the threaded area is provided which can interact with left threaded section 13 of threaded spindle 7. Adjoining threaded section 17 is a fourth cylindrical section 38. Finally, recess 31 also has a penetrating opening 39 through which a tool can be introduced into recess 31 in order to bring threaded spindle 7 into rotation. By way of example, a polygonal key can be used which engages in a corresponding recess 41 in threaded spindle 7. Finally, a coolant channel 43, into which a coolant that also serves as lubricant can be fed, can be formed in base body 29 of the first tool part which is configured as tool holder 3.

In the FIGURE it is only suggested that tool head 5 can be provided with a blade plate 45 which serves for material-removing machining of a workpiece. The configuration of the tool head is fundamentally irrelevant; thus it will not be described in greater detail here. Coolant channel 43 is arranged so that the coolant in assembled state of connection point 1 as far as possible emerges in the area of blade plate 45 and thus cools and lubricates the processing area.

In order to ensure a precise positioning or alignment between the tool parts, at least one positioning pin can be provided in the area of ring-shaped bearing surface 27 which interacts with a ring-shaped bearing surface 47 on the face of tool holder 3. But it is also possible to provide at least one end face 49 at the cylindrical section 25 of tool head 5 which interacts with an associated end face, not depicted here, in the area of cylindrical second section 35 in tool holder 3 and specifies a rotational alignment between the tool parts. The bearing surfaces also serve to transmit a torque introduced in tool holder 3 reliably to tool head 5 and thus to ensure positive slaving.

A recess 51, which serves to receive threaded spindle 7, is in like manner formed in projection 21 and base body 23 of tool head 5. A first section 53 of the recess comprises the internal threads 19. Adjoining them is a second cylindrical section 55. Finally it is also suggested that recess 51 can continue in a penetrating opening 57, which extends to the face 59 of tool head 5 and thus forms an access to recess 51 through which threaded spindle 7 can be accessed. By way of example, a polygonal key can also be introduced here which engages in a recess 61 in threaded spindle 7 so that it can be set in rotation.

Threaded spindle 7 has at least in an end area a first projecting shoulder 63 the outside diameter of which is selected such that it can engage in threaded area 17 which is configured with interior threads. Preferably the outside diameter is matched to threaded area 17 so that upon introduction of threaded spindle 7 into recess 31, first projecting shoulder 63 is held in threaded area 17. In the exemplary embodiment of connection point 1 depicted in the FIGURE, threaded spindle 7 is provided at both ends with a projecting shoulder. A second projecting shoulder 65 is also provided here, the outside diameter of which is designed so that it can be introduced into threaded area 19 in tool head 5 and if possible held there. Thus it is possible to insert threaded spindle 7 into one of the tool parts, with at least slight holding forces being developed which secure threaded spindle 7 in the inserted position.

First shoulder 63 and second shoulder 65 directly adjoin threaded section 13 and 15, respectively. Thus if first shoulder 63 is inserted into threaded area 17, the external threads of threaded spindle 7 rest against interior threads of tool holder 3 so that a defined initial position of threaded spindle 7 results. Correspondingly, upon inserting second shoulder 65 into threaded area 19, the exterior threads of threaded section 19 rests against the interior threads of threaded area 15 so that also here a defined initial position of threaded spindle 7 ensues in the case too head 5.

Thus upon assembly of connection point 1, threaded spindle 7 is inserted in one of the tool parts, for example into tool holder 3, with first projection 63 then being arranged in threaded area 17. Now the second tool part of connection point 1, thus in this case tool head 5, can be joined with the first tool part, i.e., in this case with tool holder 3, for projection 21 with cylindrical section 25 of tool head 5 to be introduced into recess 31 of tool holder 3. In this process, second shoulder 65 of threaded spindle 7 penetrates into threaded section 19 in tool head 5 and thus guides threaded spindle 7 until threaded section 15 contacts threaded area 19. Thus threaded spindle 7 on both ends has a defined initial position so that upon threaded spindle 7 being screwed tight, tipping and thus damaging of the threads is avoided. It is clear that this defined initial position can be realized even if only one of shoulders 63 and 65 is present. The connection of the tool parts is especially easy, however, if two shoulders 63 and 65 are provided on threaded spindle 7 which ensure a certain tracking even upon joining of the tool parts in the area of connection point 1.

In each case, threaded spindle 7 is held reliably in one of the tool parts while connection point 1 is joined. Now threaded spindle 7 can be set in rotation by means of a suitable tool through one of penetrating openings 39 and 57 so that its threaded sections 13 and 15 engage in threaded areas 17 and 19 of the tool parts, i.e., of tool holder 3 and tool head 5, and move them toward each other in the direction of middle axes 9 and 11. In this way, projection 21 of tool head 5 becomes secured in the area of first section 33 of tool holder 3. Through end face 49 on projection 21, a defined rotational position of tool head 5 with respect to tool holder 3 can be specified.

Upon further tightening of threaded spindle 7, contact surface 27 of tool head 5 finally rests securely on contact surface 47 of tool holder 3. Through the contact of the tool parts in the area of contact surfaces 27 and 47, a high degree of rigidity is created in the area of the connection point. In addition, a simple and very precise centering of the tool parts in first section 33 is ensured by means of projection 21. Moreover connection point 1 is very compact and space saving. It is possible to realize it even for tools with a diameter of 10 mm or less.

In the screwed-together condition of connection point 1, threaded spindle 7, which is arranged in the interior of the tool parts, forms a stiffener. It can be further improved in that shoulders 63 and 65 of threaded spindle 7 firmly contact in corresponding sections of the tool parts. By way of example, shoulder 63 can fit tightly in forth fourth cylindrical section 38 of tool holder 3 and shoulder 65 of threaded spindle 7 can fit tightly in second cylindrical section 55 of tool head 5 so that there is a quasi snug fit and thus a stabilizing of connection point 1 is realized.

It has already been stated above that connection point 1 can be provided not only in the area of the connection of a tool holder to a tool head but also in the connection area between two intermediate parts or in the connection area between a holder and an intermediate part and [between] a tool head and an intermediate part. The connection point thus can be optimally used for the modular construction of a tool. Since coolant channels can also be continued from one tool to another as a result of the specified rotary position, there are very broad variation possibilities. Since the coolant/lubricant can be brought as far as directly to the processing point or to blade plate 45, connection point 1 can be utilized even in association with a so-called minimum quantity lubrication.

It is essential to the invention that connection point 1 can be realized in a simple manner: Threaded spindle 7 need merely be inserted into one of the tool parts to be connected and as a result of shoulder 63 or 65 is securely retained there. In addition, the threaded section 13, 15 of threaded spindle 7 is arranged in a defined initial position with respect to the threaded section 17, 19, respectively, in the associated tool part. It is now possible in simple manner to plug the second tool part onto the threaded spindle 7, in particular if the latter is provided with two projecting shoulders 63, 65 so that the second tool part is also guided by the associated shoulder. Finally, the two tool parts of connection point 1 are coupled such that the threaded spindle 7 assumes a defined initial position on both sides. If threaded spindle 7 is now caused to rotate, its threaded sections 13 and 15 simultaneously engage in threaded areas 17 and 19 of the two tool parts, i.e., of tool holder 3 and tool head 5. On the other side of threaded areas 17 and 19 there are further hollow spaces in the tool parts which in tightened condition of threaded spindle 7 receive shoulders 63 and 65 and if applicable facilitate the stabilization of connection point 1 mentioned above. In the case of tool holder 3 it is fourth section 38 of recess 31 and in the case of tool head 5 it is second section 55 of recess 51. Threaded spindle 7 thus in the production of connection point 1 has not yet come to a stop in either of the tool parts, while screwing of threaded spindle and tool parts is not yet completed. Thus it is ensured in any event that the tool parts will be pressed together in the area of bearing surfaces 27 and 47 with maximum force.

Two threaded sections 13 and 15 of threaded spindle 7 can, as depicted in the FIGURE, have the same exterior diameter and interact with threaded areas 17 and 19 in the two tool parts, the interior diameters of which likewise are equal. In a further exemplary embodiment of the threaded spindle, however, it is also possible to provide threaded sections 13 and 15 with exterior diameters of differing sizes. The threaded areas of necessity have differing rotational directions in order to ensure the drawing together of the tool parts in the event of a first rotational direction and a pushing apart of the tool parts in the event of an opposite rotational direction of threaded spindle 7. In assembling connection point 1, threaded spindle 7 therefore must be inserted into the tool parts in correct orientation so that a threaded section with right-hand threads interacts with a threaded area that likewise has right-hand threads. Correspondingly, the left-hand threads must be combined with each other. If threaded sections 13 and 15 of threaded spindle 7 are now provided with differing diameter, an incorrect orientation of threaded spindle 7 can easily be avoided. Correspondingly shoulders 63 and 65 are naturally adapted to the thread diameter so that the threaded area with a larger outside diameter also has a shoulder with a larger outside diameter. Thus the shoulder of the threaded section with the larger outside diameter cannot be introduced into the threaded area of the smaller thread. In this manner it is ensured that the correct orientation of threaded spindle 7 can be easily complied with in assembling connection point 1 and damage to the threads can be avoided.

What is claimed is:

1. A device including a threaded spindle for connecting two tool parts, each of the tool parts having an associated threaded area, and wherein the device comprises:

said threaded spindle having a central axis and at least one projecting shoulder the outside diameter of which is slightly smaller than the interior diameter of the associated threaded area of one of the tool parts to approximate said interior diameter such that said at least one projecting shoulder serves to guide said threaded spindle into, and provide axial and angular alignment between, the two tool parts, said at least one projecting shoulder having a coaxially centered and axially inwardly extending opening configured to receive an axially positioned tool for effecting rotation of said threaded spindle when said at least one projecting shoulder is inserted within a tool part.

2. The device according to claim 1, wherein the threaded spindle has a first end and a second end and further comprises a projecting shoulder at each said end.

3. The device according to claim 2, wherein the outside diameter of the projecting shoulder at each end is slightly smaller than the interior threads of the associated threaded area of a corresponding tool part to approximate the interior threads thereof to guide said threaded spindle into, and provide axial and angular alignment between, the two tool parts.

4. The device according to claim 2, wherein each said projecting shoulder is configured with a centered and axially inwardly extending opening configured for receiving a tool for rotating said threaded spindle via said projecting shoulder when positioned within the tool parts.

5. The device according to claim 1, wherein said threaded spindle has two threaded sections, each being threaded in a direction opposite the other and assigned to corresponding threaded areas of the tool parts.

6. The device according to claim 5, wherein the threaded sections of the threaded spindle have differing outside diameters for being correspondingly adapted to the differing interior diameters of the two tool parts to provide angular and axial alignment of the two tool parts.

7. A connection connecting two tool pieces, the connection comprising:

a first tool piece having a threaded area for receiving a first threaded section of a threaded spindle;

a second tool piece having a threaded area for receiving a second threaded section of a threaded spindle; and a threaded spindle having a central axis and a first threaded section for engaging the threaded area of the first tool piece and a second threaded section for engaging the threaded area of the second tool piece, and wherein the threaded spindle comprises at least one projecting shoulder extending beyond one of the threaded sections, said at least one projecting shoulder having an outer diameter slightly smaller than the interior diameter of the threaded area of one of the first tool piece and second tool piece for approximating the interior diameter of said threaded area to thereby guide the threaded section into the threaded area and provide axial and angular alignment of the first and second tool pieces, said at least one projecting shoulder further having a coaxially centered and axially inwardly extending opening configured for receiving an axially positioned tool for effecting rotation of said threaded spindle via said projecting shoulder and opening when inserted in said first or second tool piece.

8. The connection according to claim 7, wherein the second tool piece partially nests within the first tool piece.

9. The connection according to claim 7, wherein the threaded spindle has opposing ends and has a projecting shoulder at each end.

10. The connection according to claim 9, wherein the outside diameter of each projecting shoulder at each end is slightly smaller than the interior threads of the associated threaded area of a corresponding tool piece to approximate said interior threads to guide said threaded spindle into place and to provide axial and angular alignment between said first and second tool pieces.

11. The connection according to claim 9, wherein each said projecting shoulder of the threaded spindle is configured with a tool-receiving portion for effecting rotation of said threaded spindle via said projecting shoulder when positioned within said first and second tool pieces.

12. The connection according to claim 7, wherein threaded sections of the threaded spindle have opposing orientation and are assigned to corresponding threaded areas of the tool pieces.

13. The connection according to claim 12, wherein the threaded sections of the threaded spindle have differing outside diameters and the threaded areas of the tool pieces have correspondingly adapted interior diameters to provide angular and axial alignment of the two tool pieces.

14. A device including a threaded spindle for connecting two tool parts, each of the tool parts having an associated threaded area, and wherein the device comprises:

said threaded spindle having a first end, a second end and a projecting shoulder extending from each said first end and second end, each said projecting shoulder having an outside diameter which is slightly smaller than the interior diameter of the associated threaded area of one of the tool parts to approximate said interior diameter such that each said projecting shoulder serves to guide said threaded spindle into, and provide axial and angular alignment between, the two tool parts, each said projecting shoulder also being configured with an axially inwardly extending opening for receiving a tool for effecting rotation of said threaded spindle when said each projecting shoulder is inserted within a tool part.

15. The device of claim 14 further comprising a threaded section positioned adjacent each said projecting shoulder for threading said threaded spindle into an associated tool part.

16. The device of claim 14 wherein each said threaded section of said threaded spindle is oppositely threaded.

* * * * *